United States Patent
Maurer

(10) Patent No.: US 8,960,357 B2
(45) Date of Patent: Feb. 24, 2015

(54) MOTOR VEHICLE WITH AN ELECTRIC DRIVE UNIT

(71) Applicant: Dr. Ing. h.c. F. Porsche Aktiengesellschaft, Stuttgart (DE)

(72) Inventor: Steffen Maurer, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 13/939,545

(22) Filed: Jul. 11, 2013

(65) Prior Publication Data

US 2014/0020971 A1    Jan. 23, 2014

(30) Foreign Application Priority Data

Jul. 19, 2012   (DE) .......................... 10 2012 106 536

(51) Int. Cl.
  *B60K 5/10*   (2006.01)
  *B60K 1/04*   (2006.01)
  *B62D 21/11*  (2006.01)
  *B60K 1/00*   (2006.01)
  *B60K 5/12*   (2006.01)

(52) U.S. Cl.
  CPC . *B60K 1/04* (2013.01); *B62D 21/11* (2013.01); *B60K 5/10* (2013.01); *B60K 1/00* (2013.01); *B60K 5/12* (2013.01); *B60Y 2304/05* (2013.01); *B60Y 2304/072* (2013.01)
  USPC ....................................................... 180/291

(58) Field of Classification Search
  CPC ................................. B60K 5/10; B62D 21/11
  USPC ........................................................... 280/791
  See application file for complete search history.

(56) References Cited

U.S. PATENT DOCUMENTS

2010/0200317 A1   8/2010   Hornburg et al.

FOREIGN PATENT DOCUMENTS

| DE | 2 058 729      | 6/1972  |
|----|----------------|---------|
| DE | 42 06 360      | 9/1993  |
| DE | 42 30 529      | 3/1994  |
| DE | 43 10 493      | 10/1994 |
| DE | 101 54 353     | 5/2002  |
| DE | 10 2006 039 106| 2/2008  |

OTHER PUBLICATIONS

German Search Report of Jun. 17, 2013.

*Primary Examiner* — Jeffrey J Restifo
*Assistant Examiner* — Erez Gurari
(74) *Attorney, Agent, or Firm* — Gerald E. Hespos; Michael J. Porco; Matthew T. Hespos

(57) ABSTRACT

A motor vehicle has a body (1) having a plurality of bearings (5, 6, 7). The bearings (5, 6, 7) are disposed and configured for mounting a supporting structure (14) that houses an electric drive unit (11) that includes an electric drive motor (12) and a high-voltage battery (13) for providing electric energy. The bearings (5, 6, 7) also are disposed and configured for mounting an internal combustion engine (8) and a transmission (9) connected to the internal combustion engine (8). Thus, the motor vehicle does not have to be redesigned depending on whether the motor vehicle is powered by an electric drive unit (11) or an internal combustion engine (8).

7 Claims, 1 Drawing Sheet

MOTOR VEHICLE WITH AN ELECTRIC DRIVE UNIT

CROSS REFERENCE TO RELATED APPLICATIONS

This application claims priority under 35 USC 119 to German Patent Appl. No. 10 2012 106 536.5 filed on Jul. 19, 2012, the entire disclosure of which is incorporated herein by reference.

BACKGROUND

1. Field of the Invention

The invention relates to a motor vehicle with an electric drive unit. The drive unit has an electric drive motor and a device that provides electric energy. The drive motor and the device form a unit that is mounted in a common supporting structure which in a vehicle body.

2. Description of the Related Art

DE 10 2006 039 106 A1 discloses a motor vehicle with an electric drive unit with an electric drive motor and a device that provides electric energy. The device that provides the electric energy is a fuel cell. The electric drive motor and the fuel cell are preassembled together with integrated electronic components on a common supporting structure and the entire unit in preassembled form is suspended in the vehicle in an oscillating manner. The unit can be mounted, for example, on the bearings that might otherwise be used to mount an internal combustion engine in an engine compartment of a vehicle. The unit then can be connected to the drive shafts (propeller shaft or axle drive shaft), to the supply of hydrogen from an accumulator or to a vehicle-integrated gas generation system and also to an air filter and optionally to an exhaust system.

DE 2 058 729 discloses a small transport vehicle, such as a golf cart with an electric drive unit that has an electric drive motor and a battery. A plastic supporting structure is provided in a sub-region of the vehicle and has a housing that forms the battery and that accommodates the electric motor. The housing has flanges for fastening the drive unit in the motor vehicle.

An object of the invention, for a motor vehicle with an improved electric drive unit and a modified mounting of the drive unit in the motor vehicle.

SUMMARY OF THE INVENTION

The invention relates to a motor vehicle with a high-voltage battery to provide electric energy. The high-voltage battery is in a supporting structure that is mounted in bearings of the body that function to support an internal combustion engine and a transmission when the motor vehicle is equipped with an internal combustion engine and a transmission.

The device providing the electric energy is an energy accumulator in the form of a high-voltage battery, but not a converter, which constitutes the fuel cell. Furthermore, the supporting structure is mounted in bearings that could be used to mount the internal combustion engine and the transmission when the motor vehicle is equipped with an internal combustion engine and a transmission.

The supporting structure may be mounted in two bearings that function for mounting the transmission when the motor vehicle is equipped with an internal combustion engine and a transmission. The two bearings preferably are mounted indirectly in the body of the motor vehicle via chassis side parts of the motor vehicle. The high-voltage battery and the electric drive motor preferably are oriented so that, in the region of the electric drive, the supporting structure is mounted in the two bearings.

The supporting structure may be mounted in a bearing that functions for mounting the internal combustion engine when the motor vehicle is equipped with the internal combustion engine and the transmission. The bearing for mounting the internal combustion engine may be next to the two bearings for mounting the transmission and may be in the region of a central tunnel sheet of the body and/or in the region of a crossmember of the body to the central tunnel sheet and/or to the crossmember. In particular it is provided that, in the region of the high-voltage battery.

The supporting structure preferably is made of metal.

The motor vehicle preferably is a passenger vehicle, in particular a sports car.

The electric drive motor and the high-voltage battery preferably form a unit that can be fitted into the motor vehicle together as an assembly. The existing bearing points of the internal combustion engine and transmission unit of the combustor-type vehicle can be used. No new holders are required on the vehicle. This affords a considerable advantage in terms of cost and weight. Furthermore, the torque of the drive can be introduced into the vehicle body via a significantly longer lever arm.

Further features of the invention emerge from the dependent claims, the attached drawing and the description of the drawing without being limited to the description of the exemplary embodiment illustrated.

DETAILED DESCRIPTION OF THE PREFERRED EMBODIMENTS

Figure 1:
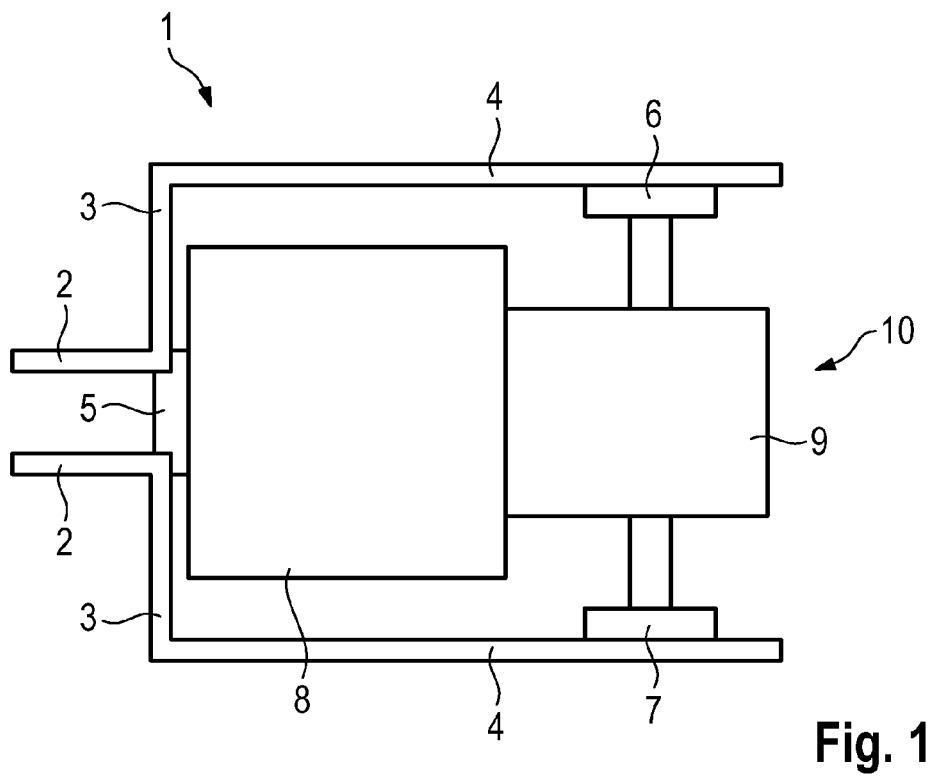
FIG. 1 is a schematic view of the mounting of an internal combustion engine and transmission unit in a body of a motor vehicle.
Figure 2:
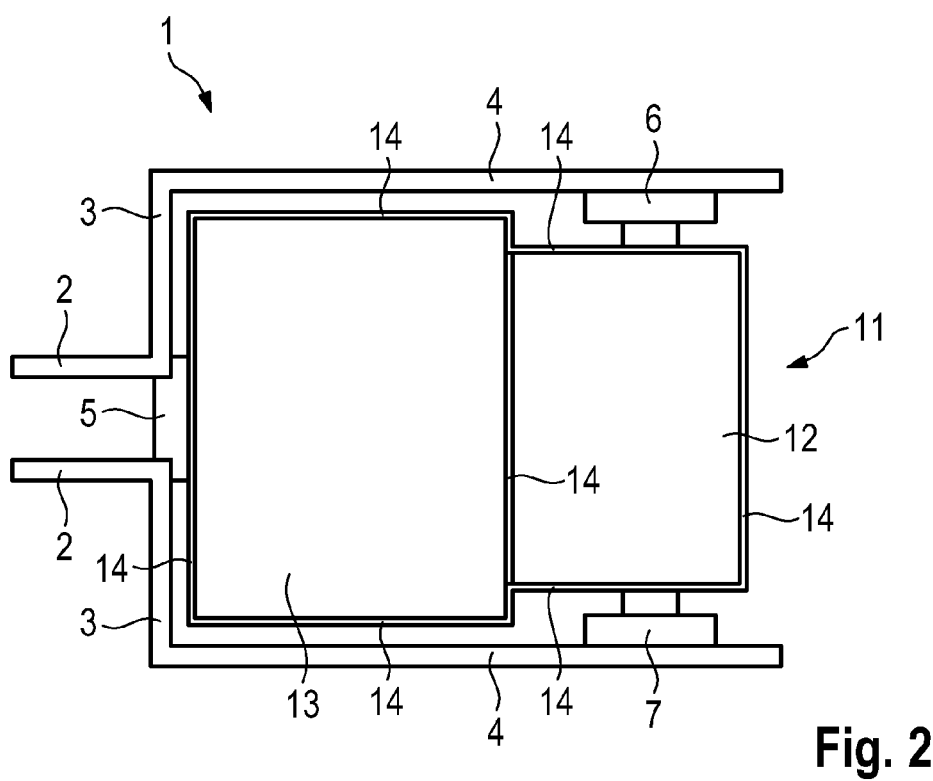
FIG. 2 the mounting in the body of the motor vehicle of the electric drive unit used in the motor vehicle according to the invention.

A body 1 of a passenger motor vehicle, and particularly of a sports car, is identified by the numeral 1 in FIGS. 1 and 2. The body 1 has a central tunnel 2, which is a central tunnel sheet, crossmembers 3 connected to the central tunnel 2 and longitudinal members 4 connected to the crossmembers 3.

A bearing 5 is connected to the central tunnel 2 and to the crossmembers 3 and further bearings 6 and 7 are connected indirectly to the longitudinal members 4 in a region of the body 1 that faces away from said bearing 5. Specifically, the bearings 6 and 7 are mounted in chassis side parts of the motor vehicle and the chassis side parts are mounted in the longitudinal members 4.

The motor vehicle is designed to mount a drive unit formed by an internal combustion engine and a transmission or a drive unit formed by an electric drive motor and a high-voltage battery. The application first mentioned is shown in FIG. 1.

FIG. 1 illustrates the embodiment of the motor vehicle where the drive unit 10 is formed from an internal combustion engine 8 and transmission 9. The drive unit 10 forms a rigid unit. The housing of the internal combustion engine 8 is flange mounted to the housing of the transmission 9 to form a supporting structure by means of which the drive unit 10 comprised of the internal combustion engine 8 and transmission 9 is mounted in the bearings 5, 6 and 7. The side of the internal combustion engine 8 that faces away from the transmission 9 is mounted in the bearing 5, which therefore has the function of the engine bearing. The transmission 9 is mounted on both sides in the bearings 6 and 7, which therefore have the function of transmission bearings.

FIG. 2 shows the motor vehicle equipped with the electric drive unit 11 according to the invention. The drive unit 11 has an electric drive motor 12 and a high-voltage battery 13. The electric drive motor 12 and the high-voltage battery 13 are placed directly adjacent and are mounted in a supporting structure 14, which is designed as an extended supporting frame for the mounting the electric drive motor 12 and the high-voltage battery 13. The electric drive motor 12 and the high-voltage battery 13 form a unit that is mounted in the supporting structure 14. The supporting structure 14 is mounted to the body 1 in the same bearings 5, 6 and 7 that were used to mount the internal combustion engine 8 and the transmission 9 of the drive unit 10 in the embodiment of FIG. 1. Specifically, the part of the supporting structure 14 in the region of the high-voltage battery 13 is mounted in the bearing 5 and the part of the supporting structure 14 in the region of the electric drive motor 12 is mounted in the bearings 6 and 7.

Accordingly, the bearings 5, 6, and 7 can be used as for the mounting of the drive unit 10 or the drive unit 11.

The supporting structure 14 is composed of metal.

What is claimed is:

1. A motor vehicle comprising a body having a opposite first and second longitudinally extending supports and at least one crossmember connected to the longitudinally extending supports, at least first and second bearings mounted respectively to the first and second longitudinally extending supports and at least a third bearing mounted to the body in proximity to the crossmember, the bearings being disposed and configured for mounting a supporting structure that houses an electric drive unit comprised of an electric drive motor and a high-voltage battery providing electric energy, the at least one third bearings further being disposed and configured for mounting an internal combustion engine and the first and second bearings further being disposed and configured for mounting a transmission connected to the internal combustion engine.

2. The motor vehicle of claim 1, wherein the first and second bearings are mounted in the body at chassis side parts of the motor vehicle.

3. The motor vehicle of claim 1, wherein the electric drive motor is in a part of the supporting structure mounted in the first and second bearings.

4. The motor vehicle of claim 1, wherein the body of the motor vehicle further comprises a central tunnel connected to the crossmember of the body, the third bearing being connected the central tunnel or to the crossmember.

5. The motor vehicle of claim 1, wherein the high-voltage battery is in a part of the supporting structure mounted in the third bearing.

6. The motor vehicle of claim 1, wherein in the supporting structure is composed of metal.

7. First and second motor vehicles, each of the motor vehicles comprising a body having substantially identical left and right longitudinally extending supports, substantially identical crossmembers connected to the longitudinally extending supports, identical left and right bearings mounted respectively to identical locations on the left and right longitudinally extending supports and identical further bearings mounted at identical locations on the respective body in proximity to the crossmember, the first motor vehicle having a supporting structure that houses an electric drive unit comprised of an electric drive motor and a high-voltage battery providing electric energy, the supporting structure being mounted to the left and right bearings and to the further bearing of the first vehicle, the second vehicle having an internal combustion engine mounted to the further bearing of the second vehicle and a transmission connected to the internal combustion engine and mounted to the left and right bearings of the second vehicle.

* * * * *